(12) United States Patent
Lloyd (10) Patent No.: US 8,437,640 B2
(45) Date of Patent: May 7, 2013

(54) NON-CONTACTING SIGNAL TRANSFER FOR ROTATING INTERFACE

(75) Inventor: David W. Lloyd, Redondo Beach, CA (US)

(73) Assignee: The Boeing Company, Chicago, IL (US)

( * ) Notice: Subject to any disclaimer, the term of this patent is extended or adjusted under 35 U.S.C. 154(b) by 919 days.

(21) Appl. No.: 12/388,786

(22) Filed: Feb. 19, 2009

(65) Prior Publication Data

US 2010/0209043 A1  Aug. 19, 2010

(51) Int. Cl.
*H04B 10/00* (2006.01)

(52) U.S. Cl.
USPC ............ 398/130; 398/128; 398/118; 398/164

(58) Field of Classification Search .................. 398/164, 398/140, 171, 135, 128, 130, 138, 118
See application file for complete search history.

(56) References Cited

U.S. PATENT DOCUMENTS

| | | | |
|---|---|---|---|
| 4,109,998 A | 8/1978 | Iverson | |
| 4,447,114 A | 5/1984 | Koene | |
| 4,465,951 A | 8/1984 | Dalby | |
| 4,580,748 A | 4/1986 | Dalby | |
| 4,752,884 A | 6/1988 | Slafer et al. | |
| 4,943,137 A | 7/1990 | Speer | |
| 5,854,702 A * | 12/1998 | Ishikawa et al. | 398/137 |
| 6,128,426 A | 10/2000 | Einhorn | |
| 6,152,402 A | 11/2000 | Augenstein | |
| 6,353,693 B1 | 3/2002 | Yoshinori et al. | |
| 6,944,402 B1 * | 9/2005 | Baker et al. | 398/128 |
| 7,099,059 B1 * | 8/2006 | Helms et al. | 398/140 |

FOREIGN PATENT DOCUMENTS

| | | | |
|---|---|---|---|
| EP | 1 775 864 A1 * | 4/2007 | |
| EP | 1775864 A1 | 4/2007 | |
| WO | 9627939 A1 | 9/1996 | |

OTHER PUBLICATIONS

EP Search Report for application 10250207.7 dated Jun. 16, 2010.

* cited by examiner

*Primary Examiner* — M. R. Sedighian
(74) *Attorney, Agent, or Firm* — Yee & Associates, P.C.

(57) ABSTRACT

An apparatus comprises a housing, a bearing member, and a transmission system. The housing has a channel in communication with an opening at a first end of the housing and a first surface at a second end of the housing. The first surface is substantially perpendicular to a rotation axis through the channel. The bearing member is capable of rotating in the channel around the rotation axis. The bearing member has a second surface substantially perpendicular to the rotation axis and substantially parallel to the first surface. The transmission system is coupled to the first surface and the second surface. The transmission system has a transmitter and a receiver. The transmission system is capable of emitting an electromagnetic radiation in a beam that is capable of being received by the receiver, while a rotation occurs between the transmitter and the receiver about the rotation axis.

20 Claims, 5 Drawing Sheets

NON-CONTACTING SIGNAL TRANSFER FOR ROTATING INTERFACE

BACKGROUND INFORMATION

1. Field

The present disclosure relates generally to an interface and, in particular, to an interface for transferring signals. Still more particularly, the present disclosure relates to a method and apparatus for transferring a signal between rotating components.

2. Background

A spacecraft may be used for a number of different purposes. For example, a spacecraft may be used for communications, observation, meteorology, navigation, planetary exploration, and other suitable purposes. A spacecraft may be unmanned or manned. A spacecraft may be, for example, without limitation, a satellite, a space shuttle, a launch vehicle, a space station, or some other suitable system or machine.

It may be desirable to have a portion of the spacecraft remain in a fixed direction, while another portion of the spacecraft may be moved relative to the fixed portion of the spacecraft. For example, with a dual-spin spacecraft, the spacecraft may have a continuously rotating section and a fixed section. The continuously rotating section may be referred to as a spinning section, while the fixed section may be referred to as a despun section.

The despun section may be pointed towards a particular object or location. For example, the despun section may be pointed towards the earth, the sun, or some other object. The spinning section produces angular momentum and gyroscopically stabilizes the attitude of the spacecraft. The spinning section also may be covered with components, such as solar cells. In this manner, the solar cells may be partially illuminated by the sun at all times in a manner to provide power to the spacecraft.

The despun section may have antennas or other equipment that may need to be continuously pointed to a particular location, such as a location on the earth's surface.

These two sections may be coupled to each other by a bearing and power transfer assembly (BAPTA). The axis of this bearing and power transfer assembly may be parallel to the spin vector. The spin vector is the vector around which the spinning section turns or spins. In these examples, this axis may be referred to as a rotation axis.

Electronics, sensors, and/or other devices may reside on both the spinning section and the despun section of the spacecraft. Information may be transferred across this interface. This information may include, for example, without limitation, data, images, commands, programs, and/or other suitable information.

The transfer of information between a spinning section and a despun section of a spacecraft may be accomplished using a series of conductive rings and contact brushes. The conductive rings also may be referred to as slip rings. These components may be integrated into an electrical contact ring assembly within the bearing and power transfer assembly. For example, the rings may be located on an inner portion of the bearing and power transfer assembly that rotates within a housing containing brushes that contact the rings as they rotate within the housing. This contact may provide for a transfer of information from one side of the interface to another side of the interface.

The conductive rings and brushes may be constructed from a number of different types of materials. A coin silver is commonly used for a bearing and power transfer assembly. Further, these designs may require a lubrication system in order to operate for the desired period of time. For example, a satellite may be required to operate for 15 years or more in orbit. These types of systems may increase the expense of a satellite, increase the weight of a satellite, and may decrease the satellite's reliability.

Therefore, it would be desirable to have a method and apparatus that overcomes the issues described above as well as possibly other issues.

SUMMARY

In one advantageous embodiment, an apparatus comprises a housing, a bearing member, and a transmission system. The housing has a channel in communication with an opening at a first end of the housing and a first surface at a second end of the housing. The first surface is substantially perpendicular to a rotation axis through the channel. The bearing member is capable of rotating in the channel around the rotation axis. The bearing member has a second surface substantially perpendicular to the rotation axis and substantially parallel to the first surface. The transmission system is coupled to the first surface and the second surface. The transmission system has a transmitter and a receiver. The transmission system is capable of emitting an electromagnetic radiation in a beam that is capable of being received by the receiver, while a rotation occurs between the transmitter and the receiver about the rotation axis.

In another advantageous embodiment, an interface system comprises a housing, a bearing member, a transmission system, motor windings, and motor magnets. The housing has a channel in communication with an opening at a first end of the housing and a first surface at a second end of the housing. The first surface is substantially perpendicular to a rotation axis through the channel. The bearing member is capable of rotating in the channel around the rotation axis. The bearing member has a second surface substantially perpendicular to the rotation axis and substantially parallel to the first surface. The transmission system is coupled to the first surface and the second surface. The transmission system has a first transmitter, a second transmitter, a first receiver, and a second receiver. The first transmitter and the second receiver are coupled to the first surface. The second transmitter and the second receiver are coupled to the second surface. The first transmitter is capable of emitting a first electromagnetic radiation in a first beam that is capable of being received by the first receiver, while a rotation occurs between the transmitter and the receiver about the rotation axis. The second transmitter is capable of emitting a second electromagnetic radiation in a second beam that is capable of being received by the second receiver, while a rotation occurs between the first transmitter and the second receiver about the rotation axis. The motor windings are located in the housing. The motor magnets are located in the bearing member. The motor windings are capable of being powered to generate an electromagnetic field that interacts with the motor magnets to turn the bearing member.

In yet another advantageous embodiment, a method is present for transferring information. A beam is transmitted using a transmitter in a transmission system located inside a channel in a housing. The transmission system is coupled to a first surface at an end of a housing in the channel and a second surface of a bearing member capable of rotating in the channel around a rotation axis. The first surface is substantially perpendicular to the rotation axis, and the second surface is substantially perpendicular to the rotation axis and substantially parallel to the first surface. The beam is received at a receiver in the transmission system, while a rotation between the housing and the bearing member around the rotation axis occurs. The beam contains the information.

The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the advantageous embodiments are set forth in the appended claims. The advantageous embodiments, however, as well as a preferred mode of use, further objectives, and advantages thereof, will best be understood by reference to the following detailed description of an advantageous embodiment of the present disclosure when read in conjunction with the accompanying drawings, wherein:

DETAILED DESCRIPTION

Figure 1:
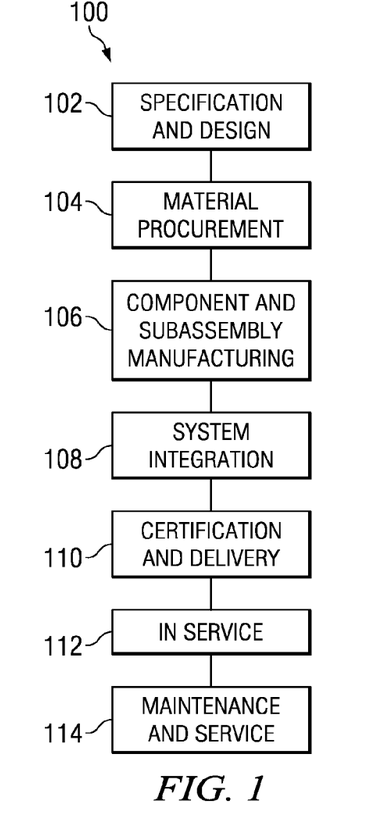
FIG. 1 is a diagram illustrating a spacecraft manufacturing and service method in accordance with an advantageous embodiment.
Figure 2:
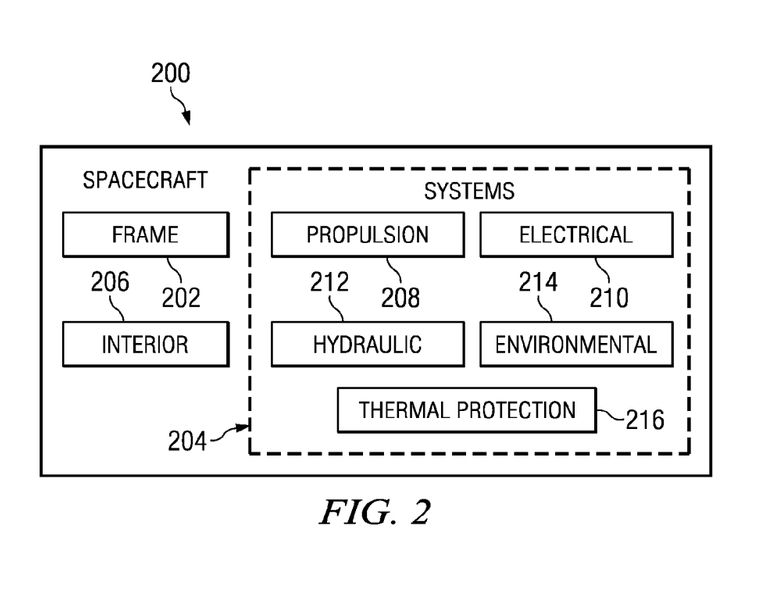
FIG. 2 is a diagram of a spacecraft in which an advantageous embodiment may be implemented.

Referring more particularly to the drawings, embodiments of the disclosure may be described in the context of spacecraft manufacturing and service method 100 as shown in FIG. 1 and spacecraft 200 as shown in FIG. 2. Turning first to FIG. 1, a diagram illustrating a spacecraft manufacturing and service method is depicted in accordance with an advantageous embodiment. During pre-production, exemplary spacecraft manufacturing and service method 100 may include specification and design 102 of spacecraft 200 in FIG. 2 and material procurement 104.

During production, component and subassembly manufacturing 106 and system integration 108 of spacecraft 200 in FIG. 2 takes place. Thereafter, spacecraft 200 in FIG. 2 may go through certification and delivery 110 in order to be placed in service 112. While in service by a customer, spacecraft 200 in FIG. 2 is scheduled for routine maintenance and service 114, which may include modification, reconfiguration, refurbishment, and other maintenance or service.

Each of the processes of spacecraft manufacturing and service method 100 may be performed or carried out by a system integrator, a third party, and/or an operator. In these examples, the operator may be a customer. For the purposes of this description, a system integrator may include, without limitation, any number of spacecraft manufacturers and major-system subcontractors; a third party may include, without limitation, any number of venders, subcontractors, and suppliers; and an operator may be a company, a military entity, a service organization, and so on.

With reference now to FIG. 2, a diagram of a spacecraft is depicted in which an advantageous embodiment may be implemented. In this illustrative example, spacecraft 200 is produced by spacecraft manufacturing and service method 100 in FIG. 1. Spacecraft 200 may include frame 202 with a plurality of systems 204 and interior 206.

Examples of plurality of systems 204 include one or more of propulsion system 208, electrical system 210, hydraulic system 212, environmental system 214, and thermal protection system 216. Although an aerospace example is shown, different advantageous embodiments may be applied to other industries, such as the automotive industry.

The different advantageous embodiments recognize and take into account a number of different considerations and/or issues. For example, the different advantageous embodiments recognize and take into account that bearing and power transfer assemblies may be subject to wear because of the pressure needed to maintain contact between the brushes and rings. This type of wear may increase electrical resistance to the contact and also may generate debris that may contaminate other areas of the spacecraft.

Further, the advantageous embodiments recognize and take into account that this type of connection may not provide the desired level of electrical contact. The brushes may generate noise in the signals passing through the brushes and that this noise problem may increase as the data rate increases.

Further, as the number of rings increase, the advantageous embodiments recognize and take into account that the length of the bearing and power transfer assembly also increases, and that this increase may result in an undesirable level of weight and volume for the bearing and power transfer assembly. Further, the friction generated by slip rings, the motor needed to provide the required torque across the bearing and power transfer assembly may increase in weight, volume, and power for the entire assembly.

The slip rings may oxidize during storage, which may take additional processing time to return these rings to the desired specifications.

The advantageous embodiments recognize and take into account that these types of systems may be expensive to provide the desired performance needed. Bearing and power transfer assemblies may be expensive to obtain with a desired weight, volume, and level of performance.

Thus, the different advantageous embodiments provide a method and apparatus for transmitting data between the sections of an object in which rotation occurs. The different advantageous embodiments may address some of these issues, as well as possibly other issues.

In one or more advantageous embodiments, an apparatus may have a housing, a bearing member, and a transmission system. The housing has a channel and is in communication with an opening in the first end of the housing. The housing also has a first surface at the second end of the housing. The first surface is substantially perpendicular to a rotation axis to the channel.

The bearing member is capable of rotating in the channel around the rotation axis. The bearing member has a second surface substantially perpendicular to the rotation axis that is substantially parallel to the first surface. The transmission system is coupled to the first surface and the second surface. The transmission system has a transmitter and a receiver. The transmitter is capable of generating electromagnetic radiation in a beam that is capable of being received by the receiver while rotation occurs between the transmitter and the receiver about the rotation axis.

Figure 3:
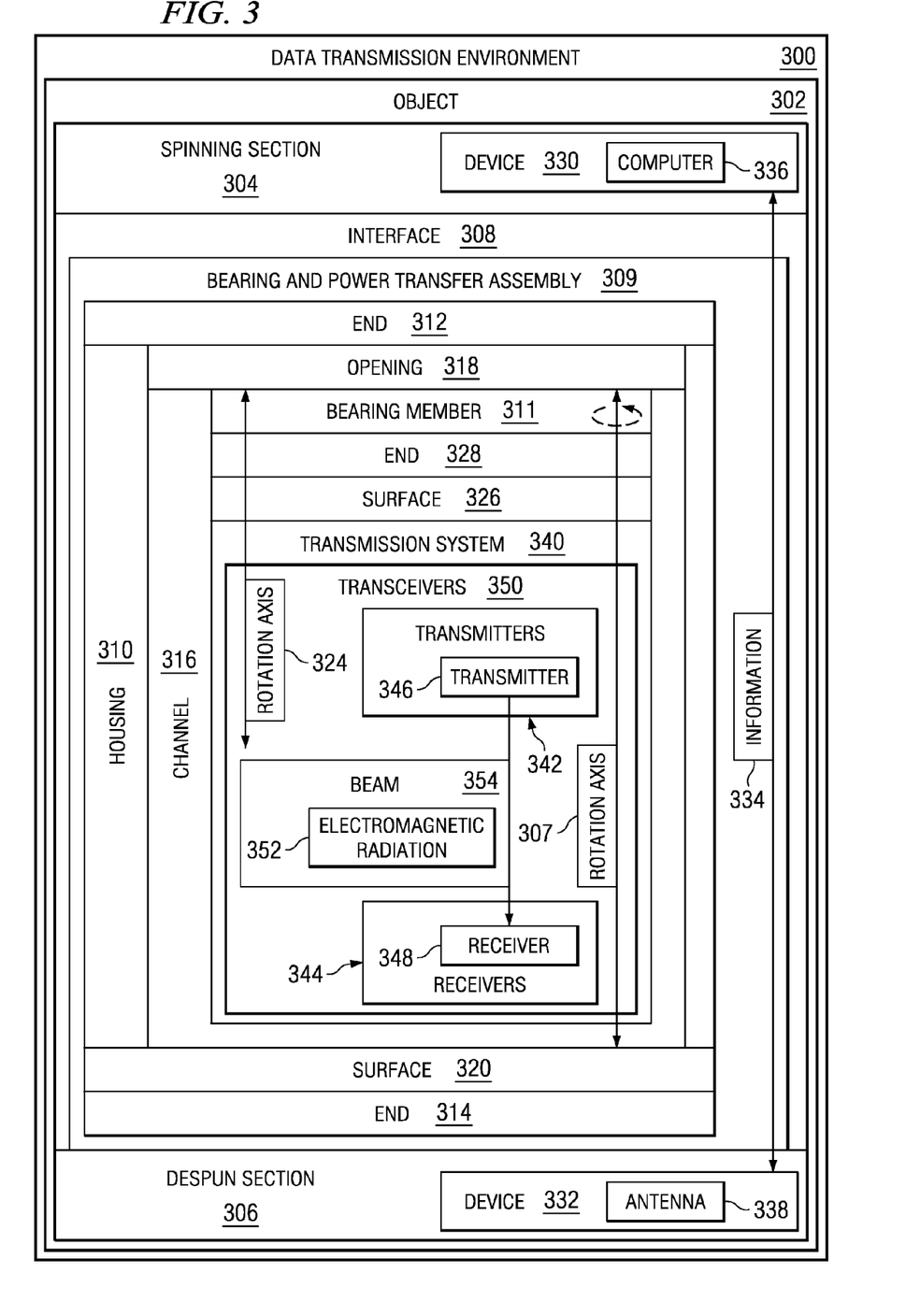
FIG. 3 is a diagram illustrating a data transmission environment in accordance with an advantageous embodiment.

With reference now to FIG. 3, a diagram illustrating a data transmission environment is depicted in accordance with an advantageous embodiment. In this illustrative example, data transmission environment 300 may include object 302. Object 302 may be, for example, spacecraft 200 in FIG. 2.

Object 302 may have spinning section 304 and despun section 306. Spinning section 304 is a section of object 302 that may continuously spin. This continuous spinning may occur all of the time, part of the time, and/or during selected periods of time during operation of object 302. Despun section 306 may remain stationary with respect to object 302. Of course, in other advantageous embodiments, despun section 306 also may be a spinning section that may spin in a direction opposite to spinning section 304. This spinning may occur along rotation axis 307.

Interface 308 may connect spinning section 304 to despun section 306. Interface 308 may be, for example, without limitation, bearing and power transfer assembly 309. Bearing and power transfer assembly 309 may include housing 310.

Bearing and power transfer assembly 309 also may include bearing member 311. Housing 310 may be connected to and/or part of spinning section 304 in these examples. Bearing member 311 may be attached to and/or part of spinning section 304.

Despun section 306 may have housing 310. Housing 310 may have end 312 and end 314, which may be opposite to each other. Channel 316 may extend from opening 318 in end 312. Surface 320 may be located at end 314. Rotation axis 307 may extend through channel 316 and may be substantially perpendicular to surface 320.

Bearing member 311 may be located within channel 316 and may rotate about rotation axis 324. In some advantageous embodiments, rotation axis 324 may be parallel to rotation axis 307. In other advantageous embodiments, rotation axis 324 may be the same as rotation axis 307. Bearing member 311 may have surface 326 at end 328. Surface 326 may be substantially parallel to surface 320 and may be substantially perpendicular to rotation axis 324. Device 330 may be located in spinning section 304, while device 332 may be located in despun section 306.

Each of these devices may generate and/or transfer information 334 between each other. Device 330 and device 332 may be any hardware and/or software system capable of generating and/or transferring information 334.

For example, device 330 in spinning section 304 may be computer 336, while device 332 in despun section 306 may be antenna 338. Antenna 338 may constantly point to a location on the earth, or some other location. Further, antenna 338 also may be manipulated to change positions. For example, computer 336 may generate and/or transfer information to antenna 338 for transmission to a destination. Further, information 334 may be received by antenna 338 and sent to computer 336.

In this illustrative example, information 334 may be transferred between spinning section 304 and despun section 306 without the use of physical contact for providing a communications link. Transmission system 340 may be coupled to spinning section 304 and despun section 306. For example, transmission system 340 may be coupled to surface 320 on housing 310 and surface 326 on bearing member 311. Transmission system 340 may include transmitters 342 and receivers 344.

As an example, transmitter 346 may transfer information 334 to receiver 348 while rotation occurs between transmitter 346 and receiver 348 about rotation axis 324. Transmitter 346 may be part of a transceiver, while receiver 348 may be part of another transceiver. In other words, transmitters 342 and receivers 344 may be part of transceivers 350.

Transmitter 346 may transmit electromagnetic radiation 352 in beam 354 to receiver 348, while rotation occurs by transmitter 346 and receiver 348 about rotation axis 324. Electromagnetic radiation 352 may take the form of a self-propagating wave that may propagate in a vacuum and/or matter. Transmitter 346 is a device capable of transmitting electromagnetic radiation 352. Transmitter 346 may be, for example, a laser diode, a light-emitting diode, or some other suitable device capable of transmitting electromagnetic radiation 352. Receiver 348 may be any device capable of detecting electromagnetic radiation 352. Receiver 348 may be, for example, without limitation, a photo cell, a photo detector, a photodiode, a photo transistor, a charged coupled device, and/or any other suitable device.

Electromagnetic radiation 352 may have different frequencies. Electromagnetic radiation 352 may have any frequency that may be capable of being transmitted in beam 354. For example, without limitation, electromagnetic radiation 352 may be microwaves, infrared radiation, visible light, ultraviolet light, and other suitable types of electromagnetic radiation that may be transmitted in a beam.

In the illustrative examples, transmitter 346 may constantly transmit data to receiver 348 or may transmit data only periodically when needed. Further, other transmitters 342 and other receivers within receivers 344 may function as backup or redundant transmitters and receivers. These devices may remain unused unless a failure occurs between transmitter 346 and receiver 348. By only using one pair of receivers and transmitters at a time, crosstalk or noise may be avoided.

The illustration of data transmission environment 300 is not meant to imply physical or architectural limitations to the manner in which different advantageous embodiments may be implemented. Some components in addition to, or in place of, the ones illustrated may be present in some advantageous embodiments. In yet other advantageous embodiments, some of the components illustrated for data transmission environment 300 may be unnecessary.

For example, in some advantageous embodiments, object 302 may have an additional spinning section and despun section in addition to spinning section 304 and despun section 306. These additional sections also may include an additional interface in addition to interface 308 to transfer data between other devices that may be present in those sections. As yet another example, in some advantageous embodiments, only a single transmitter and receiver may be present within transmission system 340 rather than transmitters 342 and receivers 344.

In yet another illustrative example, object 302 may have two sections capable of rotating around rotation axis 307 rather than spinning section 304 and despun section 306. For example, despun section 306 also may spin relative to rotation axis 307 in addition to spinning section 304 rotating.

Figure 4:
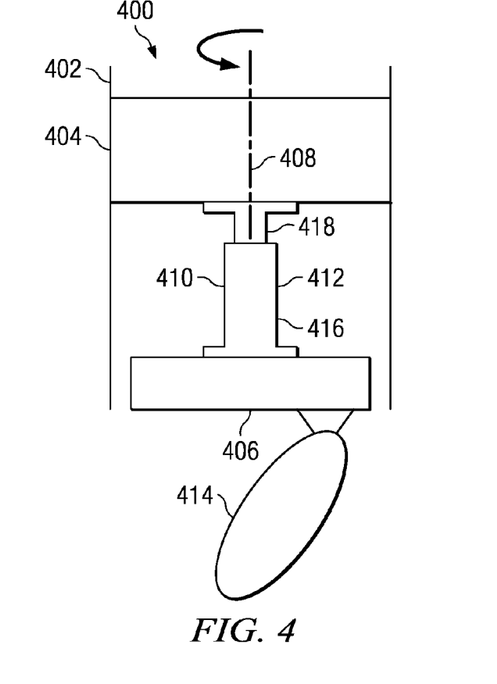
FIG. 4 is a diagram of a portion of an object in accordance with an advantageous embodiment.

Turning now to FIG. 4, a diagram of a portion of an object is depicted in accordance with an advantageous embodiment. In this illustrative example, object 400 is shown in a cross-sectional view and is an example of one implementation for object 302 in FIG. 3. Object 400 may be satellite 402. Satellite 402 is an example of one implementation for spacecraft 200 in FIG. 2.

Satellite 402 may include spinning section 404 and despun section 406. In other words, spinning section 404 may rotate around rotation axis 408, while despun section 406 remains stationary with respect to rotation axis 408.

Spinning section 404 and despun section 406 may be connected to each other using interface 410. As can be seen in this illustrative example, interface 410 may take the form of bearing and power transfer assembly 412. Bearing and power transfer assembly 412 is an example of one implementation of bearing and power transfer assembly 309 in FIG. 3. The connection provided by interface 410 may provide power and/or transfer information between spinning section 404 and despun section 406.

As depicted in this illustrative example, despun section 406 provides a platform for communications antenna 414. Housing 416 is part of despun section 406. In other words, housing 416 may be part of despun section 406 by being attached to, bonded to, and/or integrally formed as part of despun section 406. Bearing member 418 is part of spinning section 404. In a similar fashion, by being part of spinning section 404, bearing member 418 may be secured to, bonded to, and/or integrally formed as part of spinning section 404.

Figure 5:
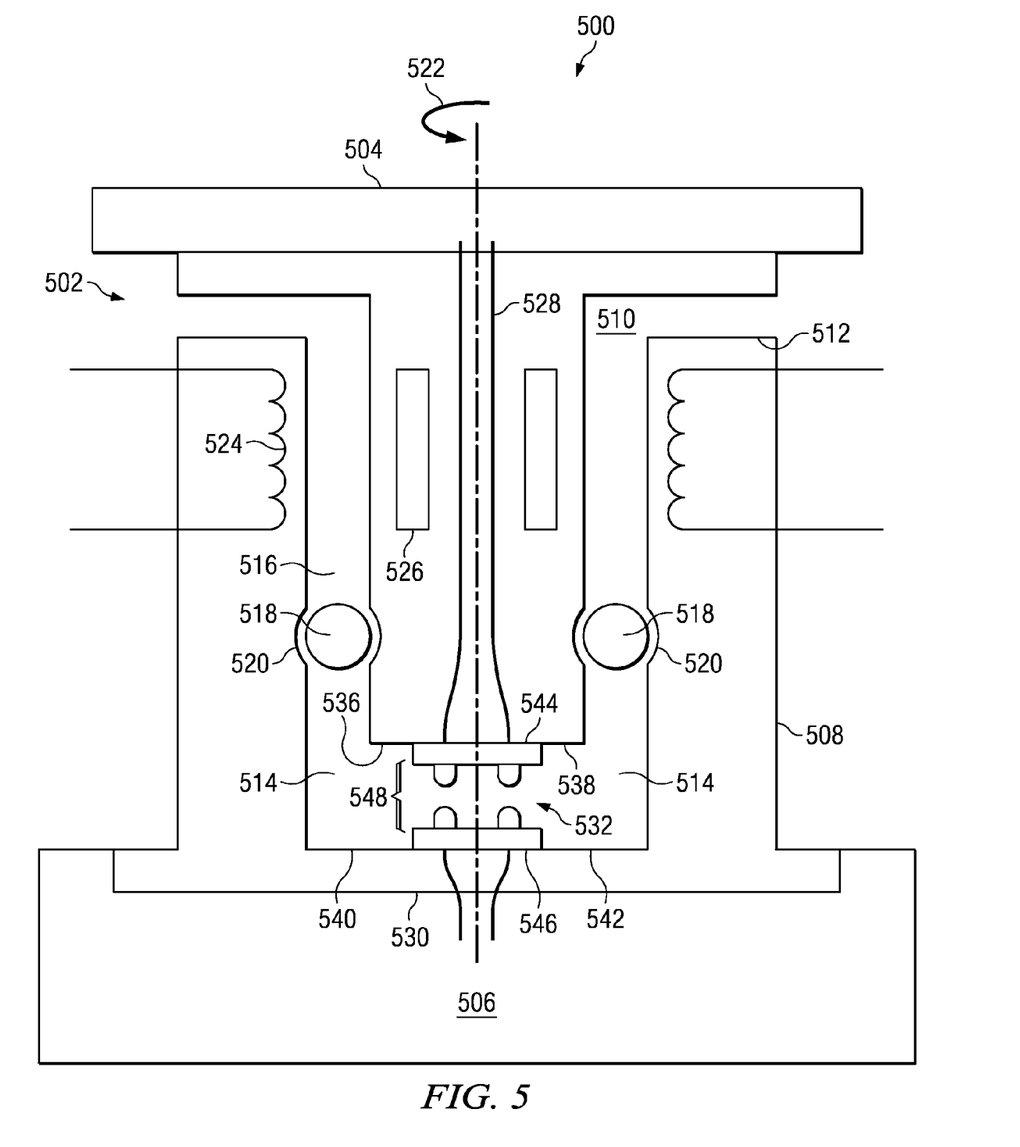
FIG. 5 is a diagram illustrating a cross-sectional view of an interface in accordance with an advantageous embodiment.

Turning next to FIG. 5, a diagram illustrating a cross-sectional view of an interface is depicted in accordance with an advantageous embodiment. In this illustrative example, interface 500 may be an example of one implementation for interface 308 in FIG. 3 and/or interface 410 in FIG. 4. Interface 500 takes the form of bearing and power transfer assembly 502.

In this illustrative example, bearing and power transfer assembly 502 may provide an interface and/or connection between spinning section 504 and despun section 506.

As depicted, housing 508 has opening 510 at end 512. Opening 510 provides communication or access to channel 514 inside housing 508. In this illustrative example, bearing member 516 is located within channel 514. Bearing member 516 is cylindrical in shape in this illustrative example. Bearing member 516 may be coupled to housing 508 through bearings 518 in groove 520. This configuration allows bearing member 516 with spinning section 504 to rotate around rotation axis 522, while housing 508 with despun section 506 may remain stationary with respect to rotation axis 522. Rotation, in this illustrative example, may be provided through motor windings 524 located in housing 508 and motor magnets 526 located in bearing member 516.

Data transfer between spinning section 504 and despun section 506 may be provided in a manner without requiring electrical and/or physical contact to transfer information. In this illustrative example, wire bundle 528 may provide a connection between a device in spinning section 504 and transmission system 532. Wire bundle 528 may provide a connection between a device in despun section 506 and transmission system 532.

Transmission system 532 is attached to surface 536 on end 530 of bearing member 516 inside of channel 514. Transmission system 532 also is coupled to surface 540 at end 542 of channel 514 in this example. Transmission system 532 may comprise transceiver unit 544 and transceiver unit 546. Information may be transferred between these transceiver units across gap 548.

The illustration of interface 500 in FIG. 5 is not meant to imply physical or architectural limitations to the manner in which other advantageous embodiments may be implemented. The illustration of interface 500 is provided as an example of one manner in which interface 308 and/or interface 410 may be implemented. For example, in some advantageous embodiments, transceiver unit 544 and transceiver unit 546 may be replaced with a receiver unit and a transmitter unit, such that transfer of information may be only in a single direction rather than bi-directional.

Figure 6:
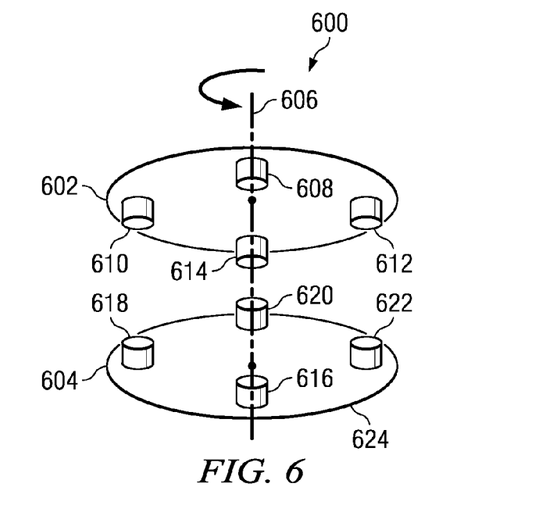
FIG. 6 is a more detailed illustration of a data transmission system in accordance with an advantageous embodiment.

Turning now to FIG. 6, a more detailed illustration of a data transmission system is depicted in accordance with an advantageous embodiment. Transmission system 600 is an example of a data transmission system that may be used to implement transmission system 532 in FIG. 5 and transmission system 340 in FIG. 3.

In this example, transmission system 600 includes transceiver unit 602 and transceiver unit 604. Transceiver unit 602 may be attached to a surface of a bearing member, while transceiver unit 604 may be attached to a surface of a housing such as, for example, housing 508 in FIG. 5. In this illustrative example, these units may rotate around rotation axis 606.

As illustrated, transceiver unit 602 includes primary receiver 608, primary transmitter 610, redundant transmitter 612, and redundant receiver 614. Transceiver unit 604 includes primary transmitter 616, primary receiver 618, redundant transmitter 620, and redundant receiver 622.

Primary transmitter 610 may transmit information to primary receiver 618, while primary transmitter 616 may transmit information to primary receiver 608. In this illustrative example, transceiver unit 602 spins or rotates around rotation axis 606, while transceiver unit 604 may remain stationary.

In these depicted examples, the primary transmitters and receivers may operate to transfer information, while the redundant transmitters and receivers are not operated. The redundant transmitters and receivers may be used if one of the primary transmitters and receivers become inoperable. A transmitter and receiver may become inoperable due to dust or debris blocking transmission, a failure within a transmitter and/or receiver, and/or due to some other condition.

Although the transmitters and receivers are illustrated as discreet components, in some advantageous embodiments, these units may be referred to as transceivers. Further, in yet other advantageous embodiments, a transceiver may integrate both components into a single physical unit.

Figure 7:
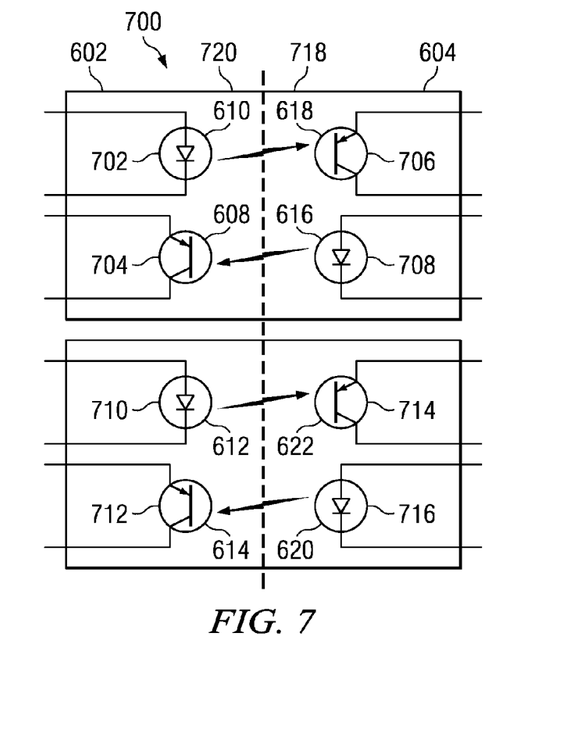
FIG. 7 is a schematic diagram of a data transmission system in accordance with an advantageous embodiment.

Turning to FIG. 7, a schematic diagram of a data transmission system is depicted in accordance with an advantageous embodiment. In this example, data transmission system 700 is a schematic diagram for components in transmission system 600 in FIG. 6.

As can be seen in this illustrative example, primary transmitter 610 may take the form of light-emitting diode 702. Primary receiver 608 may take the form of photo transistor 704. In a similar fashion, primary receiver 618 may be implemented using photo transistor 706, and primary transmitter 616 may be implemented using light-emitting diode 708.

In a similar fashion, redundant transmitter 612 may be implemented using light-emitting diode 710, while redundant receiver 614 may be implemented using photo transistor 712. Redundant receiver 622 may be implemented using photo transistor 714, while redundant transmitter 620 may be implemented using light-emitting diode 716.

With this illustrative configuration of components, transfer of information between despun section 718 and spinning section 720 may be made. The transfer of information may be performed without requiring physical contact between the different components.

Figure 8:
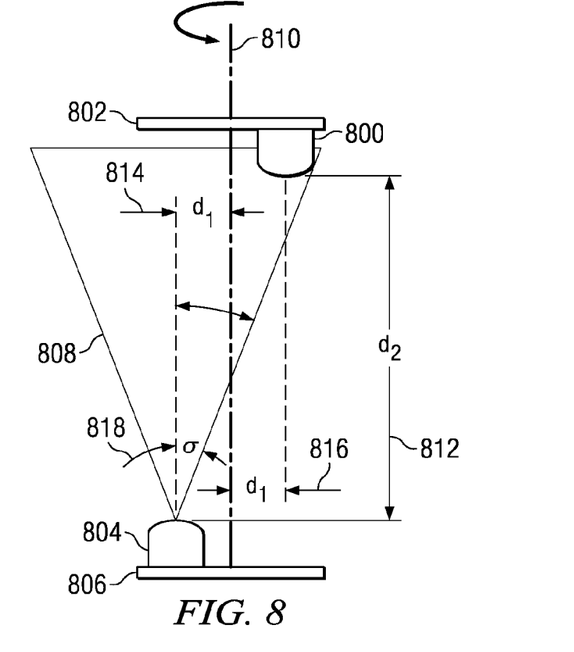
FIG. 8 is a diagram illustrating transmission of data from a transmitter to a receiver in an interface in accordance with an advantageous embodiment.

Turning now to FIG. 8, a diagram illustrating transmission of data from a transmitter to a receiver in an interface is depicted in accordance with an advantageous embodiment. In this illustrative example, receiver 800 may be attached to spinning section 802, while transmitter 804 may be attached to despun section 806.

Transmitter 804 may transmit information in beam 808. Beam 808 may take the form of a cone that may spread. Beam 808 is designed such that receiver 800 is always capable of receiving beam 808, while receiver 800 rotates around rotation axis 810. In other words, transmitter 804 provides a field of view through beam 808 that provides a capability for receiver 800 to always receive information.

In this illustrative example, distance 812 may be present between receiver 800 and transmitter 804. It may be desirable to minimize distance 812. In this manner, beam 808 may be designed to spread at angle 818, such that receiver 800 may always detect beam 808. Detecting beam 808 means that receiver 800 is able to receive information that may be transmitted by transmitter 804.

In this illustrative example, transmitter 804 has distance 814 from rotation axis 810, and receiver 800 has distance 816 from rotation axis 810. Distance 814 and distance 816 may be the same or may be different, depending on the particular implementation. Angle 818 from beam 808 may be configured through the design and/or construction of transmitter 804. For example, transmitter 804 may include or may be secured to a lens that may provide angle 818 for beam 808.

These different parameters may vary, depending on the particular implementation. For example, without limitation, distance 814 may be around one inch, while distance 812 may be around 2.75 inches. Transmitter 804 and receiver 800 may be around 0.25 inches in diameter. Angle 818 may be around 20 degrees, in this illustrative example, to provide the desired coverage for receiver 800. These parameters may be used with receivers that may have a field of view that is around 20 degrees and may minimize the size of the interface.

The configuration illustrated in this example may provide a capability for transmitter 804 to transmit information to receiver 800 when transmitter 804 is opposite of receiver 800 with respect to rotation axis 810. This separation may occur when transmitter 804 is 180 degrees apart from receiver 800 around rotation axis 810.

Figure 9:
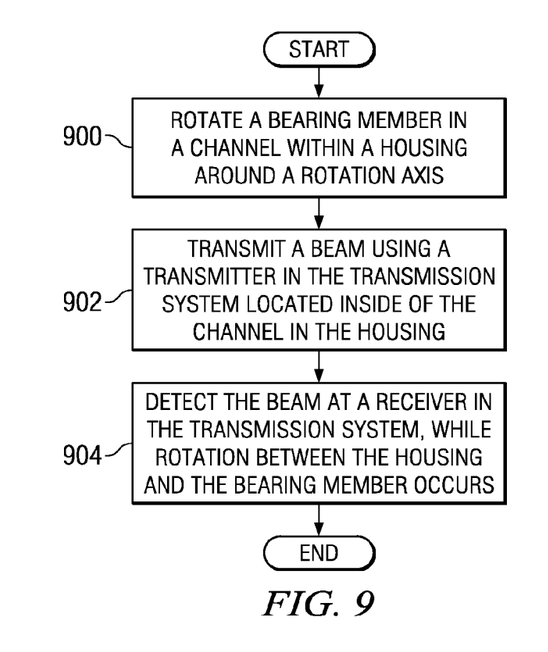
FIG. 9 is a flowchart of a process for transferring information in accordance with an advantageous embodiment.

In FIG. 9, a flowchart of a process for transferring information is depicted in accordance with an advantageous embodiment. The process illustrated in FIG. 9 may be implemented using an interface such as, for example, interface 308 in FIG. 3.

The process may begin by rotating a bearing member in a channel within a housing around a rotation axis (operation 900). The bearing member may be part of a spinning section, while the housing may be part of a despun section.

A beam is transmitted using a transmitter in a transmission system located inside of the channel in the housing (operation 902). The transmission system is coupled to a first surface at an end of the housing in the channel and a second surface on the bearing member. The second surface may be substantially perpendicular to the rotation axis and substantially parallel to the first surface.

The beam may be detected at a receiver in the transmission system, while rotation between the housing and the bearing member occurs (operation 904), with the process terminating thereafter. In these examples, the beam contains information to be transferred.

In this manner, information may be transferred between two sections that may rotate around an axis. One section may be despun, while another section may be a spinning section. In other advantageous embodiments, both sections may spin in opposite directions.

The interface in these illustrative examples may provide a capability to eliminate a need for physical contact to transfer data between two sections of an object that may rotate with respect to each other. With this type of interface, the effects of slip ring wear and tear, debris generation, and friction are eliminated. Further, with the different advantageous embodiments, the interface may be made smaller and more lightweight as compared to currently available interfaces used in spacecraft.

The different advantageous embodiments may provide an optical path or gap that may be relatively short. For example, the path may be around a few inches. Further, the interface may be virtually noise free and may support high data rates. These data rates may be, for example, around hundreds of megabits per second.

The description of the different advantageous embodiments has been presented for purposes of illustration and description, and it is not intended to be exhaustive or limited to the embodiments in the form disclosed. Many modifications and variations will be apparent to those of ordinary skill in the art. For example, although the object in the illustrative examples takes the form of a spacecraft, the different advantageous embodiments may be applied to other types of objects.

For example, without limitation, the object may be selected from one of a mobile platform, a stationary platform, a land-based structure, an aquatic-based structure, a space-based structure, a satellite, an aircraft, a surface ship, a tank, a personnel carrier, a train, a space station, a submarine, an automobile, a power plant, a bridge, a dam, a manufacturing facility, a building, and/or some other suitable object that may have sections that may rotate with respect to each other. Further, the different advantageous embodiments may be used even when spinning or rotation is not occurring.

Further, different advantageous embodiments may provide different advantages as compared to other advantageous embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. An apparatus comprising:
   a housing having a channel in communication with an opening at a first end of the housing and a first surface at a second end of the housing, wherein the first surface is substantially perpendicular to a rotation axis through the channel;
   a bearing member capable of rotating in the channel around the rotation axis, wherein the bearing member has a second surface substantially perpendicular to the rotation axis and substantially parallel to the first surface; and
   a transmission system coupled to the first surface and the second surface, wherein the transmission system has a transmitter and a receiver and wherein the transmitter is capable of emitting an electromagnetic radiation in a beam that is capable of being received by the receiver while a rotation occurs between the transmitter and the receiver about the rotation axis, the beam transmitted substantially in the form of a cone such that the receiver is always capable of receiving beam.

2. The apparatus of claim 1, wherein the transmitter is coupled to the first surface and the receiver is coupled to the second surface.

3. The apparatus of claim 1, wherein the transmitter is coupled to the second surface and the receiver is coupled to the first surface.

4. The apparatus of claim 1, wherein the transmitter is part of a first transceiver and wherein the receiver is part of a second transceiver.

5. The apparatus of claim 3, wherein the transmitter is a first transmitter, the receiver is a first receiver, the electromagnetic radiation is a first electromagnetic radiation, and the beam is a first beam, and further comprising:
   a second receiver coupled to the first surface; and
   a second transmitter coupled to the second surface, wherein the second transmitter is capable of emitting a second electromagnetic radiation in a second beam that is capable of being received by the second receiver while a rotation occurs between the first transmitter and the second receiver about the rotation axis, the second beam transmitted substantially in the form of a cone such that the second receiver is always capable of receiving the second beam.

6. The apparatus of claim 3, wherein the transmitter is a first transmitter, the receiver is a first receiver, and the beam is a first beam, and further comprising:
a second receiver coupled to the second surface; and
a second transmitter coupled to the first surface, wherein the second transmitter is capable of emitting the electromagnetic radiation in a second beam that is capable of being received by the second receiver while a rotation occurs between the first transmitter and the second receiver about the rotation axis, the second beam transmitted substantially in the form of a cone such that the second receiver is always capable of receiving the second beam.

7. The apparatus of claim 6, wherein the second receiver and the second transmitter are operated when the first receiver and the first transmitter are not operated.

8. The apparatus of claim 1, wherein the transmitter is selected from one of a laser diode and a light emitting diode.

9. The apparatus of claim 1, wherein the receiver is selected from one of a photo cell, a photo detector, a photodiode, a photo transistor, and a charged coupled device.

10. The apparatus of claim 1 further comprising:
motor windings located in the housing; and
motor magnets located in the bearing member, wherein the motor windings are capable of being powered to generate an electromagnetic field that interacts with the motor magnets to turn the bearing member.

11. The apparatus of claim 1 further comprising:
an object having a first section and a second section, wherein the housing is part of the first section and wherein the bearing member is part of the second section.

12. The apparatus of claim 11, wherein the first section is a spinning section and the second section is a despun section.

13. The apparatus of claim 1, wherein the housing, the bearing member, and the transmission system form a bearing and power transfer assembly.

14. The apparatus of claim 11, wherein the object is selected from one of a mobile platform, a stationary platform, a land-based structure, an aquatic-based structure, a space-based structure, a satellite, an aircraft, a surface ship, a tank, a personnel carrier, a train, a spacecraft, a space station, a submarine, an automobile, a power plant, a bridge, a dam, a manufacturing facility, and a building.

15. An interface system comprising:
a housing having a channel in communication with an opening at a first end of the housing and a first surface at a second end of the housing, wherein the first surface is substantially perpendicular to a rotation axis through the channel;
a bearing member capable of rotating in the channel around the rotation axis, wherein the bearing member has a second surface substantially perpendicular to the rotation axis and substantially parallel to the first surface;
a transmission system coupled to the first surface and the second surface, wherein the transmission system has a first transmitter, a second transmitter, a first receiver, and a second receiver, wherein the first transmitter and the second receiver are coupled to the first surface, wherein the second transmitter and the second receiver are coupled to the second surface, wherein the first transmitter is capable of emitting a first electromagnetic radiation in a first beam that is capable of being received by the first receiver, while a rotation occurs between the transmitter and the receiver about the rotation axis, the first beam transmitted substantially in the form of a cone such that the first receiver is always capable of receiving the first beam, and wherein the second transmitter is capable of emitting a second electromagnetic radiation in a second beam that is capable of being received by the second receiver while a rotation occurs between the first transmitter and the second receiver about the rotation axis, the second beam transmitted substantially in the form of a cone such that the second receiver is always capable of receiving the second beam;
motor windings located in the housing; and
motor magnets located in the bearing member, wherein the motor windings are capable of being powered to generate an electromagnetic field that interacts with the motor magnets to turn the bearing member.

16. The interface system of claim 15 further comprising:
an object having a first section and a second section, wherein the housing is part of the first section and wherein the bearing member is part of the second section, and wherein the object is selected from one of a mobile platform, a stationary platform, a land-based structure, an aquatic-based structure, a space-based structure, a satellite, an aircraft, a surface ship, a tank, a personnel carrier, a train, a spacecraft, a space station, a submarine, an automobile, a power plant, a bridge, a dam, a manufacturing facility, and a building.

17. The interface system of claim 15, wherein the first transmitter and the first receiver form a first transceiver and the second transmitter and the second receiver form a second transceiver.

18. A method for transferring information, the method comprising:
transmitting a beam using a transmitter in a transmission system located inside a channel in a housing, wherein the transmission system is coupled to a first surface at an end of a housing in the channel and a second surface of a bearing member capable of rotating in the channel around a rotation axis, and wherein the first surface is substantially perpendicular to the rotation axis and the second surface is substantially perpendicular to the rotation axis and substantially parallel to the first surface; and
receiving the beam at a receiver in the transmission system while a rotation between the housing and the bearing member around the rotation axis occurs, wherein the beam contains the information, the beam transmitted from the transmitter substantially in the form of a cone such that the receiver is always capable of receiving beam.

19. The method of claim 18 further comprising:
rotating the bearing member in the channel in the housing around the rotation axis.

20. The method of claim 18 further comprising:
transmitting the beam using the transmitter while rotation between the housing and the bearing member around the rotation axis is absent.

* * * * *